UNITED STATES PATENT OFFICE.

HENRY BLUMENBERG, JR., OF ORO GRANDE, CALIFORNIA.

PROCESS OF TREATING PORTLAND CEMENT AND THE RESULTING PRODUCT.

1,296,467. Specification of Letters Patent. Patented Mar. 4, 1919.

No Drawing. Application filed May 31, 1918. Serial No. 237,610.

*To all whom it may concern:*

Be it known that I, HENRY BLUMENBERG, Jr., a citizen of the United States, residing at Oro Grande, in the county of San Bernardino and State of California, have invented new and useful Improvements in Processes of Treating Portland Cement and the Resulting Product, of which the following is a specification.

My invention relates to a process of treating Portland cement and the resulting product.

It is a well known fact that concrete and other cementitious structures in contact with menstruums containing salts such as are contained in sea water, alkaline lakes, alkaline soils, are gradually disintegrated. This is due to the fact that the cement contains besides its principal constituent, tri-calcium silicate which is not affected by the salts referred to, also various proportions of aluminum, magnesium and iron silicates and oxids which are semi-soluble in the menstruums referred to and which primarily cause the disintegration of the cement.

The cement is especially liable to disintegration if it contains a rather large percentage of the oxids of aluminum, magnesium and iron and that will be the case if the clinkering temperature was not sufficiently high. It is assumed that in the burning of cement, the silicates of calcium and iron are formed first and those of aluminum and magnesium last; as the latter silicates require a higher temperature than the silicates of calcium and iron.

It is an object of this invention to produce a superior cement by the addition of certain ingredients which will form insoluble, neutral and inert compounds of the magnesium, aluminum and iron contents of the cement.

My invention consists in the steps of the process and in the resulting product hereinafter described and claimed.

I have discovered as the result of extended experiments that phosphates and borates or any other salt containing an acid radical capable of combining with aluminum, magnesium and iron to form insoluble compounds are suitable to render concrete or other cementitious structures permanent, impervious to water and not liable to disintegration. I prefer the ammonium combinations for the reason that the basic radical, ammonia, is removed either at the time of the setting of the cement or gradually thereafter into the atmosphere, while the acid radical combines with the aluminum, magnesium and iron, forming neutral, inert and insoluble compounds. As an illustration, when a very small percentage of ammonium phosphate is added to the cement, an extremely hard, dense, almost vitreous cement is produced. Briquets made of cement treated with ammonium phosphate have shown a tensile strength after twenty-eight days, ranging from 800 to 1,000 pounds per square inch breaking strain.

What the exact chemical reactions are that take place, is hard to determine, but I offer the following equations as an illustration of what I believe to take place:

$$MgO + (NH_4)_3PO_4 = MgHPO_4 + 3NH_3 + H_2O$$
$$3MgHPO_4 = H_3PO_4 + Mg_3(PO_4)_2$$

The phosphoric acid resulting in the last equation is free to combine with the other magnesium, aluminum and iron compounds present in the cement. As well known, magnesium ammonium phosphate has a solubility of only one part in about 14,000 parts of water at 20° C. and when a small quantity of ammonia is present, the same is absolutely insoluble.

It is a well known fact that calcium compounds, especially silicates, will not respond to solution having an alkaline reaction in the same manner as magnesium compounds. Both the magnesium silicate and magnesium oxid eventually become soluble in ammonium salts, and it is this very fact that makes them amenable to the phosphate reaction as described, since the cement, as it sets gradually, expels the balance of the ammonia and leaves the magnesium, likewise the aluminum and iron in the form of insoluble phosphates, which are inert to practically all reagents. The assumption for above reactions with iron, magnesium and aluminum combinations in the presence of calcium trisilicate is based on the following deductions, namely that even if calcium ammonium phosphate, $Ca(NH_4)PO_4 \cdot 7H_2O$ is formed, it is readily decomposed in the presence of water. This being so, no other combinations but the magnesium, aluminum, iron, ammonium phosphate combinations can be formed. Furthermore, practically all the calcium phosphates are more or less decomposed in the presence of water, depending on an ionic equilibrium of the phosphoric acid and calcium salt in solution. As an illustration the following is cited: In the manufacture of superphosphate when any considerable amount of iron, aluminum or magnesium oxids are present, the phosphoric acid recombines or reverts, even in the presence of sulfuric acid. This has been demonstrated by the fact that at 25° C. mono- and di-calcium salts exist together in equilibrium in a solution containing 77 grams calcium oxid and 317 grams of $P_2O_5$ proving that the calcium salts are more or less soluble and unstable when combined with phosphoric acid, while the iron, aluminum and magnesium phosphates are practically insoluble. Then again, calcium orthophosphate dissolves readily in ammoniacal solutions, while magnesium phosphate is practically insoluble, their solubility being one part in 44,000 parts of water at 20° C.

The ammonium phosphate is preferably added to the ground cement and the quantity thereof will depend upon the magnesium, aluminum and iron contents of the same, but usually will not exceed from one-half to one per cent. The ammonium phosphate may be applied to the concrete or other cementitious structures after the same are in place, by spraying a solution thereon, or by any other suitable means. Considerably more of the ammonium phosphate can be applied after the cement has had its initial set.

Various changes may be made by those skilled in the art without departing from the spirit of my invention, as claimed.

I claim:

1. A process of treating hydraulic cement after it has been clinkered, with an ammonium salt, whose acid radical is capable of forming an insoluble compound with the magnesium in the cement.

2. A process of treating hydraulic cement after it has been clinkered, with a salt, whose acid radical is capable of forming an insoluble compound with the magnesium in the cement.

3. A process of treating hydraulic cement after it has been clinkered, with ammonium phosphate.

4. A hydraulic cement containing a salt having an acid radical capable of forming an insoluble compound with the magnesium, aluminum and iron bases contained in the cement.

5. A hydraulic cement containing an ammonium salt, having an acid radical capable of forming an insoluble compound with the magnesium, aluminum and iron bases contained in the cement.

6. A hydraulic cement containing ammonium phosphate.

7. A hydraulic cement containing a salt having an acid radical capable of forming an insoluble compound with the magnesium compounds contained in the cement.

In testimony whereof I have signed my name to this specification.

HENRY BLUMENBERG, Jr.

Copies of this patent may be obtained for five cents each, by addressing the "Commissioner of Patents, Washington, D. C."